(12) United States Patent
Kato et al.

(10) Patent No.: US 11,843,342 B2
(45) Date of Patent: Dec. 12, 2023

(54) MOTOR DRIVE CONTROL DEVICE AND MOTOR DRIVE CONTROL METHOD

(71) Applicant: MINEBEA MITSUMI Inc., Nagano (JP)

(72) Inventors: Hiroyuki Kato, Fukuroi (JP); Takamichi Kitano, Kakegawa (JP)

(73) Assignee: MINEBEA MITSUMI Inc., Nagano (JP)

( * ) Notice: Subject to any disclaimer, the term of this patent is extended or adjusted under 35 U.S.C. 154(b) by 152 days.

(21) Appl. No.: 17/435,461

(22) PCT Filed: Jan. 9, 2020

(86) PCT No.: PCT/JP2020/000403
§ 371 (c)(1),
(2) Date: Sep. 1, 2021

(87) PCT Pub. No.: WO2020/188960
PCT Pub. Date: Sep. 24, 2020

(65) Prior Publication Data
US 2022/0181995 A1    Jun. 9, 2022

(30) Foreign Application Priority Data

Mar. 19, 2019 (JP) .................................. 2019-051174

(51) Int. Cl.
*H02P 6/08* (2016.01)
*H02K 11/215* (2016.01)
(Continued)

(52) U.S. Cl.
CPC .............. *H02P 6/08* (2013.01); *H02K 11/215* (2016.01); *H02K 11/33* (2016.01); *H02P 6/06* (2013.01); *H02P 6/17* (2016.02)

(58) Field of Classification Search
CPC ...... H02P 6/08; H02P 6/06; H02P 6/17; H02P 23/14; H02P 6/15; H02K 11/215; H02K 11/33; Y02P 80/10
(Continued)

(56) References Cited

U.S. PATENT DOCUMENTS

| 6,002,234 A * | 12/1999 | Ohm ........................ H02P 6/06 318/438 |
| 9,660,560 B2 * | 5/2017 | Kemp ..................... H02P 6/153 |
| 2016/0126872 A1 | 5/2016 | Miyauchi |

FOREIGN PATENT DOCUMENTS

| JP | 2008-099511 A | 4/2008 |
| JP | 2008-125246 A | 5/2008 |
| WO | 2015/045669 A1 | 4/2015 |

OTHER PUBLICATIONS

International Search Report for corresponding International Application No. PCT/JP2020/000403 dated Mar. 10, 2020.
(Continued)

*Primary Examiner* — David Luo
(74) *Attorney, Agent, or Firm* — Pearne & Gordon LLP

(57) ABSTRACT

A motor drive control device capable of driving a motor at high efficiency is provided. A control unit (3) of a motor drive control device (1) outputs a control signal to a motor drive unit (2) to control operation of an inverter circuit (21) for energizing a motor (7). The control unit (3) detects an actual rotational speed of the motor (7), detects a power-supply voltage, detects a magnitude of current flowing in the motor (7), and calculates a magnitude of driving torque of the motor (7) based on detection results. The control unit (3) compares a reference rotational speed obtained based on the calculated magnitude of the driving torque of the motor (7) and the actual rotational speed of the motor (7), and determines an advance angle value based on a comparison result.

(Continued)

The control unit (3) outputs the control signal based on the determined advance angle value.

5 Claims, 5 Drawing Sheets

(51) Int. Cl.
    *H02K 11/33*     (2016.01)
    *H02P 6/17*     (2016.01)
    *H02P 6/06*     (2006.01)
(58) Field of Classification Search
    USPC .......................................... 318/400.01, 700
    See application file for complete search history.

(56) References Cited

OTHER PUBLICATIONS

Written Opinion for corresponding International Application No. PCT/JP2020/000403 dated Mar. 10, 2020 and English translation.
Office Action dated Feb. 28, 2023 for corresponding Japanese Application No. 2019-051174 and English translation.

* cited by examiner

| DRIVING TORQUE VALUE [mNm] | T1 | T2 | T3 | T4 |
|---|---|---|---|---|
| REFERENCE ROTATIONAL SPEED [rpm] | r1 | r2 | r3 | r4 |

FIG.4

MOTOR DRIVE CONTROL DEVICE AND MOTOR DRIVE CONTROL METHOD

TECHNICAL FIELD

This disclosure relates to a motor drive control device and a motor drive control method, and particularly to a motor drive control device and a motor drive control method for performing advance angle adjustment.

BACKGROUND ART

Conventionally, various methods for adjusting the phase angle of a motor have been proposed.

For example, in Patent Literature 1 below, a method of estimating an increase/decrease in load based on a calculated driving torque and decreasing a current advance angle value when the driving torque is decreased is described.

DOCUMENT LIST

Patent Literature

Patent Literature 1: Japanese Patent Application Publication No. 2008-099511

SUMMARY OF DISCLOSURE

Technical Problem

If the advance angle value is set according to the rotational speed as in Patent Literature 1, the advance angle value is no longer optimal when the motor load changes, worsening the efficiency to increase the power consumption, as well as failing to maintain the rotational speed to decrease the motor output at a heavy load. Another method is to set the advance angle value based on a calculated magnitude of the driving torque, that is, of the load. In this case, the advance angle value changes when the input power changes such as due to a change in internal temperature, resulting in an unstable rotational speed and variation in the rotational speed or the like between individual motors. In order to achieve a high driving output and realize a high motor efficiency, it is required to perform advance angle control to adjust the motor driving to an appropriate state.

It is an object of the present disclosure to provide a motor drive control device and a motor drive control method capable of driving a motor at high efficiency.

Solution to Problem

In order to achieve the above-mentioned object, according to an aspect of this present disclosure, a motor drive control device includes: a motor drive unit including a circuit for energizing a motor; and a control unit outputting a control signal to the motor drive unit to control operation of the circuit, wherein the control unit includes: a rotational speed detecting unit detecting an actual rotational speed of the motor; a power-supply voltage detecting unit detecting a power-supply voltage; a current detecting unit detecting a magnitude of current flowing in the motor; a torque computing unit calculating a magnitude of driving torque of the motor based on a detection result of the rotational speed detecting unit, a detection result of the power-supply voltage detecting unit and a detection result of the current detecting unit; a rotational speed comparing unit comparing a reference rotational speed obtained based on the magnitude of driving torque of the motor calculated by the torque computing unit and the actual rotational speed of the motor detected by the rotational speed detecting unit; and an advance angle value determining unit determining an advance angle value based on a comparison result of the rotational speed comparing unit, and the control unit outputs the control signal based on the advance angle value determined by the advance angle value determining unit.

Preferably, the control unit further includes a storage unit, a table is stored in advance in the storage unit, a magnitude of driving torque of the motor and the reference rotational speed being associated with each other in the table, and the rotational speed comparing unit obtains the reference rotational speed based on the magnitude of driving torque of the motor calculated by the torque computing unit and the table.

Preferably, the reference rotational speed is a rotational speed obtaining an efficiency of a predetermined value or above with respect to the magnitude of driving torque of the motor.

Preferably, the advance angle value determining unit determines, as a new advance angle value, a value decreased by a first predetermined value from a current advance angle value when the rotational speed comparing unit determines the actual rotational speed of the motor to be larger than the reference rotational speed, and the advance angle value determining unit determines, as a new advance angle value, a value increased by a second predetermined value from a current advance angle value when the rotational speed comparing unit determines the actual rotational speed of the motor to be smaller than the reference rotational speed.

Preferably, the control signal includes an advance angle indication value and a speed indication value, and the speed indication value is determined in correspondence with a rotational speed instruction.

According to another aspect of this present disclosure, a motor drive control method is a motor drive control method for controlling operation of a motor by using a circuit for energizing the motor, the motor drive control method including: a rotational speed detecting step of detecting an actual rotational speed of the motor; a power-supply voltage detecting step of detecting a power-supply voltage; a current detecting step of detecting a magnitude of current flowing in the motor; a torque computing step of calculating a magnitude of driving torque of the motor based on a detection result of the rotational speed detecting step, a detection result of the power-supply voltage detecting step and a detection result of the current detecting step; a rotational speed comparing step of comparing a reference rotational speed obtained based on the magnitude of driving torque of the motor calculated by the torque computing step and the actual rotational speed of the motor; an advance angle value determining step of determining an advance angle value based on a comparison result of the rotational speed comparing step; and a control step of controlling operation of the circuit based on the advance angle value determined by the advance angle value determining step.

Effects of Present Disclosure

According to these present disclosures, it possible to provide a motor drive control device and a motor drive control method capable of driving a motor at high efficiency.

BRIEF DESCRIPTION OF DRAWINGS

FIG. 4 A diagram showing an example of reference rotational speed information stored in a storage unit.

DESCRIPTION OF EMBODIMENTS

Hereinafter, electronic equipment using a motor drive control device in one embodiment of the present disclosure will be described.

Figure 1:
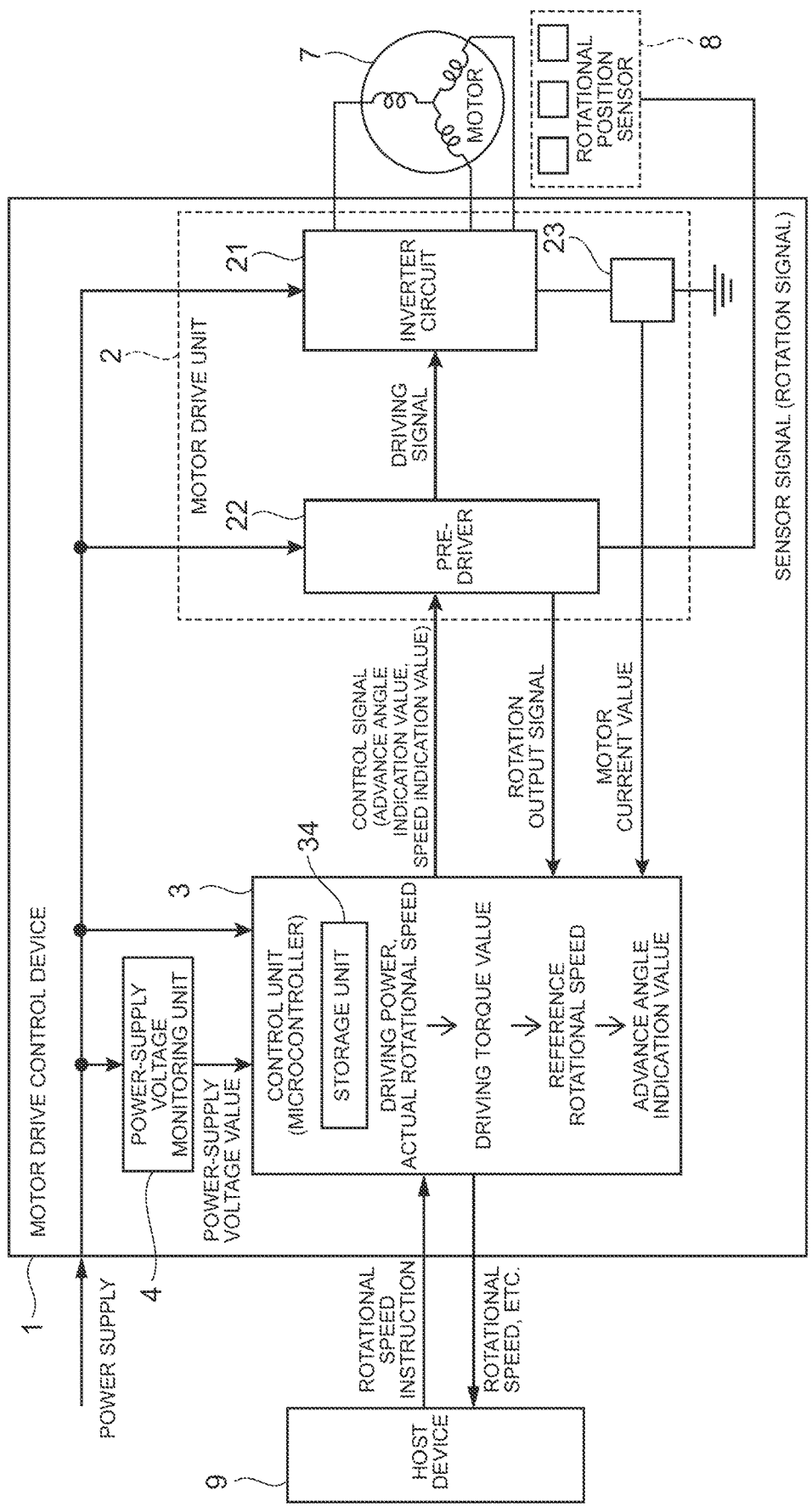
FIG. 1 A block diagram showing a schematic circuit configuration of a motor drive control device in one embodiment of the present disclosure.

FIG. 1 is a block diagram showing a schematic circuit configuration of a motor drive control device 1 in one embodiment of the present disclosure.

As shown in FIG. 1, the motor drive control device 1 is configured to drive a brushless motor 7 (hereinafter simply referred to as a motor 7) in a 180-degree energization scheme involving advance angle control, for example. In the present embodiment, the motor 7 is, for example, a three-phase brushless motor. The motor drive control device 1 supplies driving power to the motor 7 to drive the motor 7. The 180-degree energization scheme is a scheme in which a driving pattern is generated based on the rotational speed and driving is performed in accordance with the rotational position such that currents flowing in the coils of the motor 7 become sine waves. Specifically, for example, the motor drive control device 1 rotates the motor 7 by outputting a sine-wave driving signal to the motor 7 to periodically pass driving current through the coils of the motor 7. Note that the motor 7 is not limited to the brushless motor and may be another motor. In addition, the method for driving the motor 7 is not limited to the 180-degree energization scheme and may be another driving method.

The motor drive control device 1 includes a motor drive unit 2, a control unit 3, and a power-supply voltage monitoring unit 4. The motor drive control device 1 is supplied with, for example, a predetermined power-supply voltage. The power-supply voltage is supplied to each of the motor drive unit 2 and the control unit 3. Note that the components shown in FIG. 1 are part of the entire motor drive control device 1, and the motor drive control device 1 may include other components in addition to those shown in FIG. 1.

The motor drive control device 1 drives the motor 7 based on a rotational speed instruction sent from a host device 9. The host device 9 is, for example, electronic equipment or the like on which the motor 7 and the motor drive control device 1 are mounted. Note that the motor drive control device 1 may be configured to drive the motor 7 by using a predetermined rotational speed as the rotational speed instruction, not based on the rotational speed instruction from another device. The motor drive control device 1 may also be configured to generate a rotational speed instruction of a rotational speed corresponding to a signal sent from the host device 9 or the like and operate according to the rotational speed instruction.

In the present embodiment, the motor drive unit 2 and the control unit 3 are each an integrated circuit device (IC) in which circuits for realizing respective functions are integrated and packaged. Note that the motor drive unit 2 and the control unit 3 may be packaged as a single integrated circuit device, or the entirety or part of the motor drive control device 1 may be packaged together with another device to constitute a single integrated circuit device.

The motor drive unit 2 includes an inverter circuit 21, a pre-driver (pre-driving circuit) 22, and a current detecting circuit 23. The motor drive unit 2 supplies driving power to the motor 7 based on a speed indication value related to the rotational speed of the motor 7 and an advance angle indication value input from the control unit 3.

The inverter circuit 21 constitutes the motor drive unit 2 together with the pre-driver 22. The inverter circuit 21 outputs driving power to the motor 7 based on a driving signal output from the pre-driver 22 and energizes the coils provided in the motor 7. That is, the inverter circuit 21 is a circuit for energizing the motor 7. For example, the inverter circuit 21 has a configuration in which a series-circuit pair of two switching devices provided at both ends of a power-supply voltage are arranged for each phase (U phase, V phase, W phase) of the coils. For each pair of two switching devices, each phase terminal of the motor 7 is connected at the connecting point of the switching devices. By changing the on/off combination of the two switching devices for each phase, whether to pass current through the coil of that phase and the direction of the current are changed.

The pre-driver 22 generates a driving signal for driving the inverter circuit 21 based on control by the control unit 3 and outputs it to the inverter circuit 21. The pre-driver 22 generates the driving signal based on a speed indication value and an advance angle indication value output from the control unit 3. For example, six types of signals corresponding to the respective switching devices of the inverter circuit 21 are output as driving signals. When these driving signals are output, the switching devices corresponding to the respective driving signals perform on/off operations, and the driving signals are output to the motor 7 so that electric power is supplied to each phase of the motor 7.

In the present embodiment, a rotation signal, which is a sensor signal output from a rotational position sensor 8 provided to the motor 7, is input to the pre-driver 22. The pre-driver 22 outputs a driving signal according to a driving condition of the motor 7 based on the rotation signal.

The rotational position sensor 8 is, for example, a Hall sensor (such as a Hall device or a Hall IC). For example, three Hall sensors corresponding to the respective phases of the coils of the motor 7 are provided. That is, the rotational position sensor 8 outputs the rotation signal according to the rotational position of the rotor of the motor 7. The pre-driver 22 outputs a driving signal according to the rotational position of the rotor based on the rotation signal. Note that the method for detecting the rotational position of the rotor of the motor 7 is not particularly limited and may be, for example, a sensorless scheme in which the position of the rotor is detected based on back electromotive force instead of the rotational position sensor 8.

The pre-driver 22 outputs a rotation output signal corresponding to the rotational speed of the motor 7 to the control unit 3 according to the input rotation signal. The rotation output signal is, for example, an FG signal.

The current detecting circuit 23 detects the magnitude of current flowing in the motor 7 (motor current value). For example, the current detecting circuit 23 includes a resistor for obtaining a voltage value corresponding to the magnitude of current flowing in the motor 7. That is, the motor current value is detected as a voltage value by the resistor provided between a switching device of the inverter circuit 21 and the ground potential. In other words, the current detecting circuit 23 functions as a sensor for detecting the motor current value flowing in the coils of the motor 7. The motor current value detected by the current detecting circuit 23 is output to the control unit 3.

The control unit 3 outputs the speed indication value and the advance angle indication value to the motor drive unit 2 to control the operation of the motor drive unit 2. That is, the control unit 3 outputs a control signal to the motor drive unit 2 to control the operation of the inverter circuit 21.

The rotational speed instruction output from the host device 9 is input to the control unit 3. The control unit 3 outputs the speed indication value to the pre-driver 22 of the motor drive unit 2 based on the rotational speed instruction. The rotational speed instruction is, for example, a PWM signal. The control unit 3 outputs the speed indication value based on the input rotational speed instruction. That is, the speed indication value is determined in correspondence with the rotational speed instruction. The forms of the rotational speed instruction and the speed indication value are not limited thereto. In addition, the control unit 3 may also be configured to convert the input rotational speed instruction to output the speed indication value. Note that, although a start/stop signal, a braking signal, a rotating direction setting signal and the like, for example, are input from the host device 9 to the control unit 3, the illustration thereof is omitted.

The rotation output signal output from the pre-driver 22 is input to the control unit 3. As will be described later, the control unit 3 includes a rotational speed detecting unit 32 (shown in FIG. 2) for detecting the actual rotational speed of the motor 7 (which may also be referred to as an actual rotational speed) based on the rotation output signal. That is, the control unit 3 detects the rotational speed of the motor 7 based on an output of the rotational position sensor 8 provided to the motor 7. Note that a rotation signal output from the rotational position sensor 8 or an FG signal from an FG sensor provided to the motor 7 may also be input to the control unit 3. In this case, the control unit 3 may detect the rotational speed of the motor 7 based on the input signal.

The control unit 3 outputs, to the host device 9, a signal indicating the rotational speed of the motor 7. The control unit 3 also outputs, to the host device 9, a signal corresponding to a driving state of the motor 7. The host device 9 can output various instructions related to driving of the motor 7 such as the rotational speed instruction to the motor drive control device 1 based on these signals. Note that these signals may not be output from the control unit 3. For example, the rotation signal from the rotational position sensor 8 and the rotation output signal from the pre-driver 22 may be directly input to the host device 9.

The power-supply voltage monitoring unit 4 monitors the power-supply voltage supplied to the motor drive control device 1. The power-supply voltage monitoring unit 4 outputs, to the control unit 3, the voltage value of the power-supply voltage (power-supply voltage value) obtained by the monitoring. The control unit 3 (more specifically, an analog signal converting unit 31, which will be described later) detects the power-supply voltage supplied to the motor drive control device 1 based on the input power-supply voltage value.

[Description Regarding Setting of Advance Angle Indication Value]

In the present embodiment, the control unit 3 functions as an advance angle value determining unit for determining an advance angle value, and outputs a control signal including an advance angle indication value based on the determined advance angle value. As described below, the control unit 3 performs a motor drive control method including: a rotational speed detecting step of detecting an actual rotational speed of the motor 7; a power-supply voltage detecting step of detecting a power-supply voltage; a current detecting step of detecting a magnitude of current flowing in the motor 7 (motor current value); a torque computing step of calculating a magnitude of driving torque of the motor 7 (driving torque value) based on a detection result of the rotational speed detecting step, a detection result of the power-supply voltage detecting step and a detection result of the current detecting step; a rotational speed comparing step of comparing a reference rotational speed obtained based on the magnitude of driving torque of the motor 7 calculated by the torque computing step and the actual rotational speed of the motor 7; an advance angle value determining step of determining an advance angle value based on a comparison result of the rotational speed comparing step; and a control step of controlling operation of the inverter circuit 21 based on the advance angle value determined by the advance angle value determining step.

Figure 2:
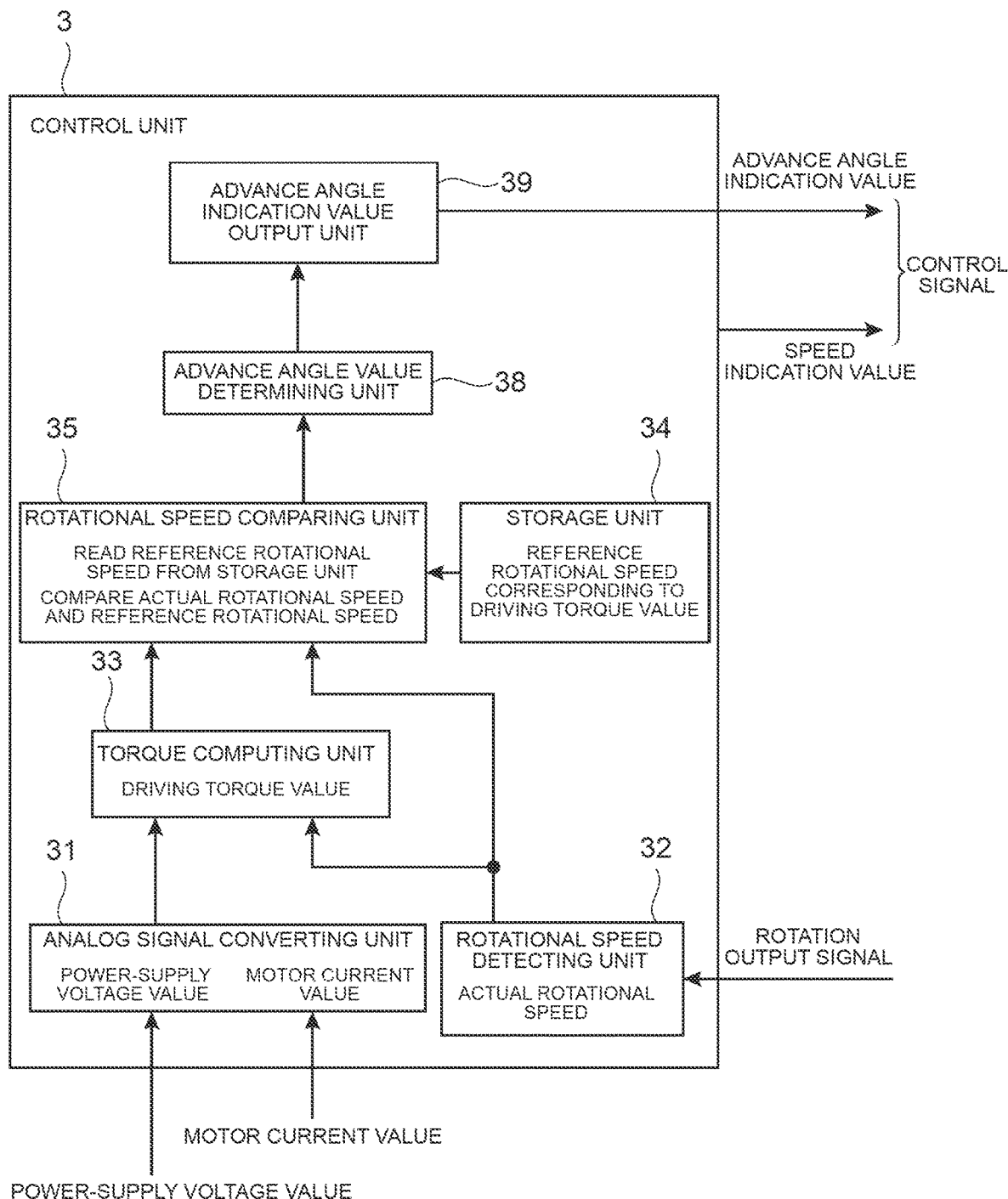
FIG. 2 A diagram showing a configuration of a control unit according to the present embodiment.

FIG. 2 is a diagram showing a configuration of a control unit 3 according to the present embodiment.

As shown in FIG. 2, the control unit 3 includes an analog signal converting unit 31 (an example of a power-supply voltage detecting unit, an example of a current detecting unit), a rotational speed detecting unit 32, a torque computing unit 33, a storage unit 34, a rotational speed comparing unit 35, an advance angle value determining unit 38, and an advance angle indication value output unit 39. The control unit 3 is, for example, a microcontroller. The control unit 3 can be configured by using an IC with a relatively simple configuration and a low cost, instead of a microcontroller having a complex configuration. Note that the components of the control unit 3 are not limited thereto. For example, description of what is related to the output of the speed indication value and the like will be omitted.

The analog signal converting unit 31 functions as a power-supply voltage detecting unit for detecting the power-supply voltage. That is, the analog signal converting unit 31 performs A/D conversion on the power-supply voltage value input to the control unit 3. The analog signal converting unit 31 then outputs, to the torque computing unit 33, detection information of the power-supply voltage value converted into a digital signal.

The analog signal converting unit 31 also functions as a current detecting unit for detecting the magnitude of current flowing in the motor 7. That is, the analog signal converting unit 31 performs A/D conversion on the motor current value input to the control unit 3. The analog signal converting unit 31 then outputs, to the torque computing unit 33, detection information of the motor current value converted into a digital signal.

The rotational speed detecting unit 32 detects the actual rotational speed of the motor 7. That is, the rotational speed detecting unit 32 detects the rotational speed of the motor 7 based on the rotation output signal output from the pre-driver 22 of the motor drive unit 2, and outputs the detection result (actual rotational speed) to the torque computing unit 33 and the rotational speed comparing unit 35.

The torque computing unit 33 calculates the magnitude of driving torque of the motor 7 (a driving torque value) based on the actual rotational speed, which is the detection result of the rotational speed detecting unit 32, and the power-supply voltage value and the motor current value, which are the detection results of the analog signal converting unit 31. The torque computing unit 33 outputs the calculated driving torque value to the rotational speed comparing unit 35.

Note that the driving torque value is obtained from the following computing equation by using a value of input power obtained from the power-supply voltage value and the motor current value. Here, T indicates the driving torque value [mNm], ω indicates the angular speed [rad/s], P indicates the input power [W], and η indicates the efficiency.

$$T=P/\omega \times \eta$$

The storage unit 34 is, for example, a flash memory. The storage unit 34 stores reference rotational speed information. The reference rotational speed information is preset information. The reference rotational speed information is, for example, a lookup table in which the magnitude of driving torque of the motor 7 and a reference rotational speed corresponding to it are associated with each other.

Note that the reference rotational speed information may be stored as a computational expression for calculating the reference rotational speed based on the driving torque value, for example.

The rotational speed comparing unit 35 reads the reference rotational speed from the storage unit 34 based on the input driving torque value. That is, the rotational speed comparing unit 35 references the reference rotational speed information stored in the storage unit 34 and reads the reference rotational speed corresponding to the input driving torque value.

The rotational speed comparing unit 35 also compares the input actual rotational speed and the reference rotational speed read from the storage unit 34. That is, the rotational speed comparing unit 35 compares the reference rotational speed obtained based on the magnitude of driving torque of the motor 7 calculated by the torque computing unit 33 and the actual rotational speed of the motor 7 detected by the rotational speed detecting unit 32. The rotational speed comparing unit 35 then outputs the comparison result to the advance angle value determining unit 38.

The advance angle value determining unit 38 determines an advance angle value based on the comparison result of the rotational speed comparing unit 35. The determined advance angle value is output to the advance angle indication value output unit 39.

In the present embodiment, the advance angle value determining unit 38 determines, as a new advance angle value, a value decreased by a first predetermined value from the current advance angle value when it is determined in the rotational speed comparing unit 35 that the actual rotational speed of the motor 7 is larger than the reference rotational speed. On the other hand, the advance angle value determining unit 38 determines, as a new advance angle value, a value increased by a second predetermined value from the current advance angle value when it is determined in the rotational speed comparing unit 35 that the actual rotational speed of the motor 7 is smaller than the reference rotational speed.

The advance angle indication value output unit 39 sets an advance angle indication value based on the advance angle value determined by the advance angle value determining unit 38 and outputs the set advance angle indication value to the motor drive unit 2. The motor drive unit 2 then outputs, to the motor 7, a driving signal to which an advance angle is applied based on the advance angle indication value.

Note that the advance angle value determining unit 38 may also be configured to determine the amount by which the advance angle value is to be increased/decreased from the current advance angle value so that the advance angle indication value output unit 39 outputs the determined value as the advance angle indication value. In this case, in the motor drive unit 2, energization of the motor 7 is performed with the advance angle amount being increased/decreased based on the advance angle indication value.

Figure 3:
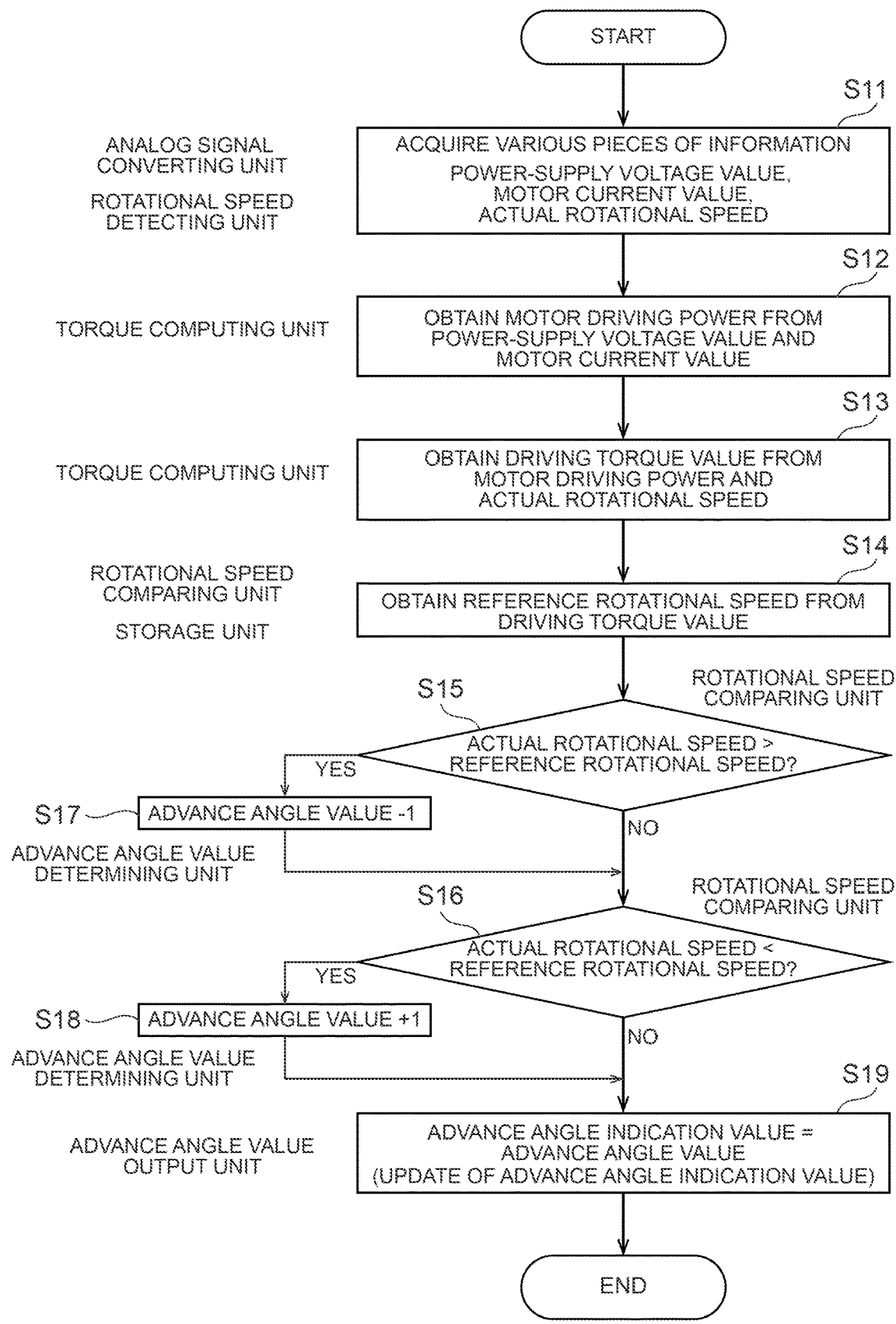
FIG. 3 A flow chart showing operations of the control unit.

FIG. 3 is a flow chart showing operations of the control unit 3.

In FIG. 3, only a processing flow regarding the setting of the advance angle indication value performed in the control unit 3 is shown. The control unit 3 performs the setting of the advance angle indication value (calculation of the advance angle value) in the following manner by means of the above-mentioned units of the analog signal converting unit 31, the rotational speed detecting unit 32, the torque computing unit 33, the storage unit 34, the rotational speed comparing unit 35, the advance angle value determining unit 38, and the advance angle indication value output unit 39. Note that the process shown in FIG. 3 is always repeatedly performed when the motor drive control device 1 is in operation.

In step S11, the control unit 3 detects and acquires various pieces of information used for the setting of the advance angle indication value. That is, the analog signal converting unit 31 detects a power-supply voltage value and a motor current value (a power-supply voltage detecting step, a current detecting step). In addition, an actual rotational speed is detected by the rotational speed detecting unit 32 (a rotational speed detecting step).

In step S12, the torque computing unit 33 obtains a motor driving power from the power-supply voltage value and the motor current value.

In step S13, the torque computing unit 33 obtains a driving torque value of the motor 7 from the motor driving power and the actual rotational speed (a torque computing step).

In step S14, the rotational speed comparing unit 35 obtains a reference rotational speed from the driving torque value based on reference rotational speed information stored in the storage unit 34.

In step S15 and step S16, the rotational speed comparing unit 35 compares the reference rotational speed and the actual rotational speed (a rotational speed comparing step). That is, in step S15, the rotational speed comparing unit 35 determines whether the actual rotational speed is larger than the reference rotational speed. If the actual rotational speed is larger than the reference rotational speed, the process proceeds to step S17 (step S15: YES), and otherwise the process proceeds to step S16 (step S15: NO).

In step S16, the rotational speed comparing unit 35 determines whether the actual rotational speed is smaller than the reference rotational speed. If the actual rotational speed is smaller than the reference rotational speed, the process proceeds to step S18 (step S16: YES), and otherwise the process proceeds to step S19 (step S16: NO).

In step S17 and step S18, the advance angle value determining unit 38 computes an advance angle value based on the result of comparing the reference rotational speed and the actual rotational speed (an advance angle value determining step).

In step S17, the advance angle value determining unit 38 determines the advance angle value to be a value obtained by subtracting one unit from the original value. For example, the advance angle value is decreased by one degree. Thereafter, the process proceeds to step S16.

In step S18, the advance angle value determining unit 38 determines the advance angle value to be a value obtained by adding one unit to the original value. For example, the advance angle value is increased by one degree. Thereafter, the process proceeds to step S19.

Note that, in step S17 and step S18, the amount by which the advance angle value is increased/decreased may be set appropriately.

In step S19, the advance angle indication value output unit 39 performs updating of the advance angle indication value. That is, the advance angle indication value output unit 39 sets the advance angle value increased/decreased in the advance angle value determining unit 38 as a new advance angle indication value. The advance angle indication value output unit 39 controls operation of the inverter circuit 21 by outputting the set advance angle indication value to the motor drive unit 2 (a control step).

Note that the order in which the process of step S15 and its associated process of step S17 and the process of step S16 and its associated process of step S18 are performed is not limited in this order. These processes may be performed in an order different from this or may be performed in parallel.

FIG. 4 is a diagram showing an example of the reference rotational speed information stored in the storage unit 34.

As shown in FIG. 4, the reference rotational speed information is information in which driving torque values of the motor 7 and reference rotational speeds corresponding to them are associated with each other, and is set in response to a rotational speed instruction. The number of combinations between driving torque values and reference rotational speeds is not limited to that shown in the figure and may be set more minutely.

The reference rotational speed refers to a rotational speed at which an efficiency of a predetermined value or above is obtained with respect to the magnitude of driving torque of the motor 7. The reference rotational speed is what is expressed as a numerical value such that a combination of a rotational speed and a driving torque value can be derived based on information obtained by evaluating torque characteristics or the like of the motor 7 in advance, and is a target value obtained for each different driving torque value. More specifically, a reference rotational speed corresponding to a certain driving torque value is a rotational speed when the motor 7 is rotated with the maximum efficiency at which the driving torque value occurs, but is not limited thereto and may be a rotational speed at which an efficiency of a certain level or above is obtained, instead of a rotational speed at which the maximum efficiency is obtained.

Figure 5:
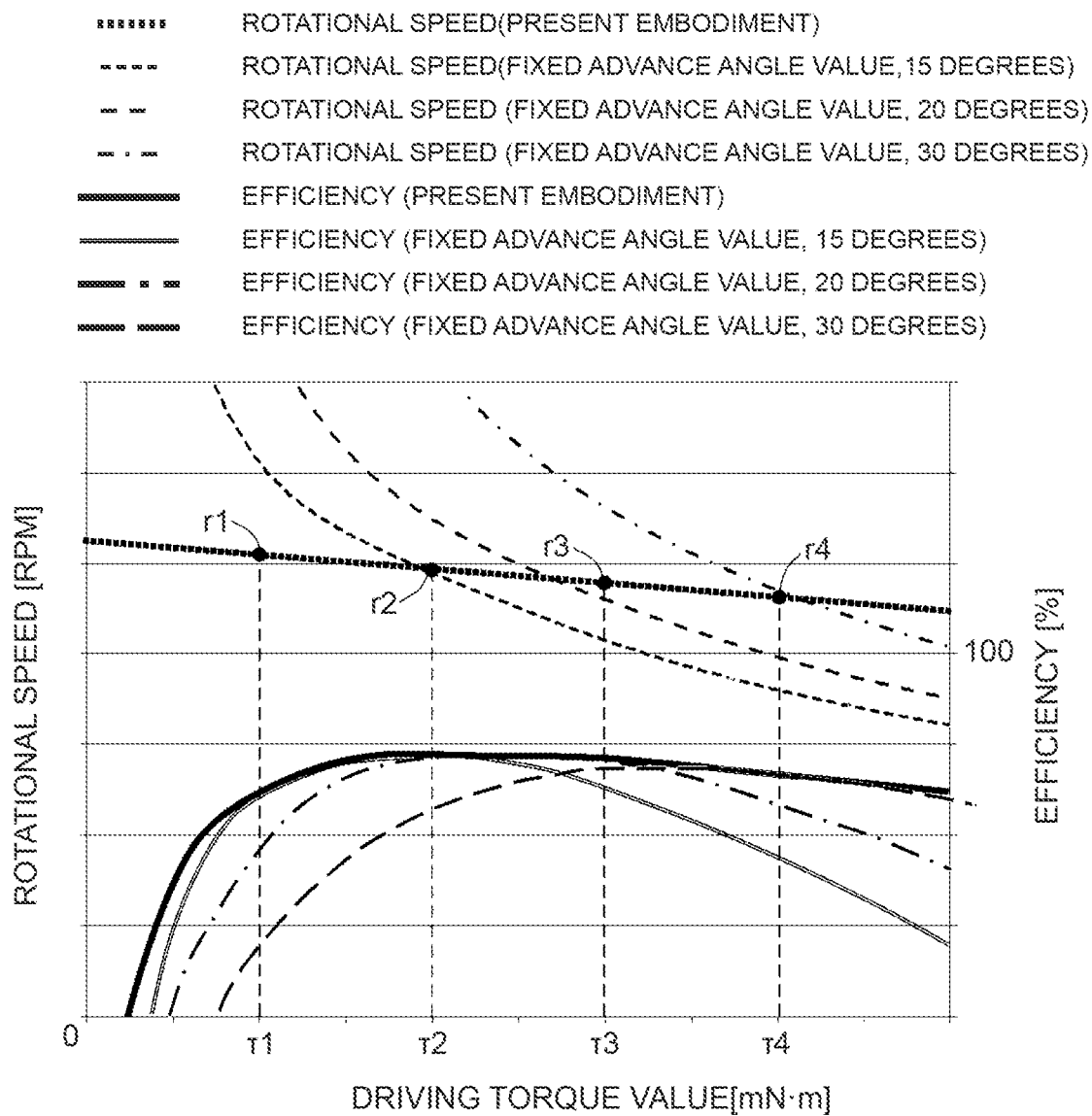
FIG. 5 A graph showing a relationship of the rotational speed with the driving torque value and a relationship of the motor efficiency with the driving torque value for a predetermined rotational speed instruction.

FIG. 5 is a graph showing a relationship of the rotational speed with the driving torque value and a relationship of the efficiency of the motor 7 with the driving torque value for a predetermined rotational speed instruction.

In FIG. 5, a curve indicating a relationship of the efficiency with the driving torque value and a curve indicating a relationship of the rotational speed with the driving torque value are shown for each of the case where the motor 7 is driven with each of three fixed advance angle values (15 degrees, 20 degrees and 30 degrees) and the case where advance angle control is performed based on the rotational speed as in the present embodiment.

As shown in FIG. 5, at any driving torque value, the efficiency is higher in the case where advance angle control is performed based on the rotational speed in the present embodiment than in the case where the motor 7 is driven with a fixed advance angle value. In addition, regarding changes in the rotational speed with respect to changes in the driving torque value, variation is smaller in the case where advance angle control is performed based on the rotational speed in the present embodiment than in the case where the motor 7 is driven with a fixed advance angle value.

As described above, in the present embodiment, the reference rotational speed is used to compare with the actual rotational speed and determine whether to increase or decrease the advance angle value, as discussed above. The control unit 3 computes the driving torque value of the motor 7 driving, derives the optimal rotational speed stored from the driving torque value obtained by the computation, and compares it with the actual rotational speed. Control is performed such that the advance angle value is increased when the actual rotational speed is lower and the advance angle value is decreased when the actual rotational speed is higher. By repeatedly performing such control, the advance angle value of the motor 7 is adjusted, and the motor 7 comes to drive at a rotational speed close to the reference rotational speed at a certain driving torque value. That is, the motor 7 comes to drive with high efficiency. In other words, the control unit 3 performs control of the advance angle value such that the motor 7 is driven at a rotational speed and a driving torque value with high efficiency by utilizing characteristics that the rotational speed and the driving torque value of the motor 7 driving change according to the advance angle value. Therefore, it is possible to drive the motor 7 with high efficiency in a wide range of driving torque values. It is possible to reduce power consumption of the motor 7 in a wide range of driving torque values.

Since the object to be rotated by the motor 7 (for example, if the motor 7 is a fan motor, its impeller) is used in various load conditions, advance angle control to adjust the driving of the motor 7 to an appropriate state according to the load and the rotational speed is required. When the advance angle value is not appropriate, the efficiency of the motor 7 is worsened, the power consumption is increased, and moreover, a high driving output (operating a heavy load at a high rotational speed) cannot be maintained. As discussed above, the rotational speed at which the efficiency is high is not constant and changes according to the magnitude of the load. In the present embodiment, it is possible to operate the object to be rotated with high efficiency by controlling the advance angle value toward a reference rotational speed at which the efficiency becomes high as a target value.

For example, in the case where the advance angle value is computed based only on the driving state of the motor 7 such as in a method of directly setting the advance angle value from a calculated magnitude of the driving torque, that is, of the load, the advance angle value changes when the input power changes due to a change in the internal temperature even with the same type of motor 7. Thus, as a result, there are problems that the rotational speed of the motor 7 is unstable and variation in the rotational speed or the like between individual motors 7 occurs. In particular, since the rotational speed largely changes according to the advance angle value in the 180-degree energization, there is a large effect. In contrast, in the present embodiment, since the advance angle value is adjusted based on the reference rotational speed information as a target, it is possible to stabilize the rotational speed of the motor 7 and reduce variation between the individual motors 7.

The control unit 3 stores the reference rotational speed information in which magnitudes of driving torque and their corresponding optimal rotational speeds are associated with each other in advance in response to the rotational speed instruction, and performs control to rotate at a reference rotational speed based on it. Therefore, it is possible to drive the motor 7 with high efficiency in a wide range of load states. In addition, since such control to adjust the advance angle is always performed, it is possible to drive the motor 7 to even follow a situation of load variation and maintain the state of high efficiency. Since the advance angle control is performed based on the reference rotational speed information, it is possible to easily and accurately perform the advance angle control.

It is possible to perform the setting of the advance angle indication value only with the simple microcontroller constituting the control unit 3, which does not require high cost, without using a special circuit. Therefore, it is possible to reduce the manufacturing cost of the motor drive control device 1.

[Others]

The motor drive control device is not limited to the circuit configuration as shown in the above-described embodiment. Various circuit configurations configured to adapt the object of the present disclosure can be applied.

For example, the pre-driver may be eliminated, and the control unit may be configured to directly output the driving signal to the inverter circuit. In this case, the control unit is only required to be configured to control the operation of the inverter circuit by outputting the driving signal to the inverter circuit based on the advance angle value determined by the advance angle value determining unit.

The motor driven by the motor drive control device of the present embodiment is not limited to a three-phase brushless motor and may be a brushless motor with a different number of phases. In addition, the type of the motor is not particularly limited.

The method for detecting the rotational speed of the motor is not particularly limited, and various methods can be used, such as a method using a Hall sensor, a method of reading an FG signal of a pre-driver and a method of monitoring back electromotive force.

The scheme for driving the motor is not limited to typical sine-wave driving and may be a driving scheme using rectangular waves, a driving scheme using trapezoidal waves, a driving scheme with specially modulated sine waves, or the like.

The motor current value is not limited to the motor current value flowing in the coils of the motor. For example, the control unit may detect the magnitude of input current as the motor current value.

The above-described flow chart shows an example for describing the operations, and there is no limitation thereto. The steps shown in the flow chart figures are a specific example, and there is no limitation to the flow, for example, the order of the steps may be changed or another process may be interposed between steps, or processes may be parallelized.

Some or all of the processing in the above-described embodiment may be performed by software or may be performed using a hardware circuit. For example, the control unit is not limited to a microcontroller. In the internal configuration of the control unit, at least part may be processed by software.

The above-described embodiment should be considered to be illustrative but not limiting in any point. The scope of the present disclosure is indicated by the claims but not by the above description and is intended to encompass any modifications within the meaning and scope equivalent to the claims.

LIST OF REFERENCE SIGNS

1 motor drive control device,
2 motor drive unit,
3 control unit,
4 power-supply voltage monitoring unit,
7 motor,
8 rotational position sensor,
21 inverter circuit,
22 pre-driver,
23 current detecting circuit,
31 analog signal converting unit (example of power-supply voltage detecting unit, example of current detecting unit),
32 rotational speed detecting unit,
33 torque computing unit,
34 storage unit,
35 rotational speed comparing unit,
38 advance angle value determining unit,
39 advance angle indication value output unit

The invention claimed is:

1. A motor driving control device comprising:
a motor driving unit comprising a circuit for energizing a motor; and
a control unit outputting a control signal to the motor driving unit to control operation of the circuit, wherein the control unit comprises:
a rotational speed detecting unit detecting an actual rotational speed of the motor;
a power-supply voltage detecting unit detecting a power-supply voltage;
a current detecting unit detecting a magnitude of current flowing in the motor;
a torque computing unit calculating a magnitude of driving torque of the motor based on a detection result of the rotational speed detecting unit, a detection result of the power-supply voltage detecting unit and a detection result of the current detecting unit;
a rotational speed comparing unit comparing a reference rotational speed obtained based on the magnitude of driving torque of the motor calculated by the torque computing unit and the actual rotational speed of the motor detected by the rotational speed detecting unit; and
an advance angle value determining unit determining an advance angle value based on a comparison result of the rotational speed comparing unit, and
the control unit outputs the control signal based on the advance angle value determined by the advance angle value determining unit,
wherein the reference rotational speed is a rotational speed obtaining an efficiency of a predetermined value or above with respect to the magnitude of driving torque of the motor.

2. The motor driving control device according to claim 1, wherein
the control unit further comprises a storage unit,
a table is stored in advance in the storage unit, a magnitude of driving torque of the motor and the reference rotational speed being associated with each other in the table, and
the rotational speed comparing unit obtains the reference rotational speed based on the magnitude of driving torque of the motor calculated by the torque computing unit and the table.

3. The motor driving control device according to claim 1, wherein the control signal includes an advance angle indication value and a speed indication value, and the speed indication value is determined in correspondence with a rotational speed instruction.

4. A motor driving control device comprising:
a motor driving unit comprising a circuit for energizing a motor; and
a control unit outputting a control signal to the motor driving unit to control operation of the circuit, wherein the control unit comprises:

a rotational speed detecting unit detecting an actual rotational speed of the motor;

a power-supply voltage detecting unit detecting a power-supply voltage;

a current detecting unit detecting a magnitude of current flowing in the motor;

a torque computing unit calculating a magnitude of driving torque of the motor based on a detection result of the rotational speed detecting unit, a detection result of the power-supply voltage detecting unit and a detection result of the current detecting unit;

a rotational speed comparing unit comparing a reference rotational speed obtained based on the magnitude of driving torque of the motor calculated by the torque computing unit and the actual rotational speed of the motor detected by the rotational speed detecting unit; and an advance angle value determining unit determining an advance angle value based on a comparison result of the rotational speed comparing unit, and the control unit outputs the control signal based on the advance angle value determined by the advance angle value determining unit, wherein the advance angle value determining unit determines, as a new advance angle value, a value decreased by a first predetermined value from a current advance angle value when the rotational speed comparing unit determines the actual rotational speed of the motor to be larger than the reference rotational speed, and the advance angle value determining unit determines, as a new advance angle value, a value increased by a second predetermined value from a current advance angle value when the rotational speed comparing unit determines the actual rotational speed of the motor to be smaller than the reference rotational speed.

5. A motor driving control method for controlling operation of a motor by using a circuit for energizing the motor, the motor driving control method comprising:

a rotational speed detecting step of detecting an actual rotational speed of the motor;

a power-supply voltage detecting step of detecting a power-supply voltage;

a current detecting step of detecting a magnitude of current flowing in the motor;

a torque computing step of calculating a magnitude of driving torque of the motor based on a detection result of the rotational speed detecting step, a detection result of the power-supply voltage detecting step and a detection result of the current detecting step;

a rotational speed comparing step of comparing a reference rotational speed obtained based on the magnitude of driving torque of the motor calculated by the torque computing step and the actual rotational speed of the motor;

an advance angle value determining step of determining an advance angle value based on a comparison result of the rotational speed comparing step; and a control step of controlling operation of the circuit based on the advance angle value determined by the advance angle value determining step, wherein the reference rotational speed is a rotational speed obtaining an efficiency of a predetermined value or above with respect to the magnitude of driving torque of the motor.

* * * * *